United States Patent
Dou et al.

(10) Patent No.: US 9,871,581 B2
(45) Date of Patent: Jan. 16, 2018

(54) MONITORING APPARATUS AND METHOD FOR AN OPTICAL SIGNAL-TO-NOISE RATIO AND RECEIVER

(71) Applicant: FUJITSU LIMITED, Kawasaki (JP)

(72) Inventors: Liang Dou, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/008,625

(22) Filed: Jan. 28, 2016

(65) Prior Publication Data
US 2016/0233955 A1   Aug. 11, 2016

(30) Foreign Application Priority Data

Feb. 10, 2015   (CN) .......................... 2015 1 0068356

(51) Int. Cl.
H04B 10/079   (2013.01)
H04B 10/077   (2013.01)

(52) U.S. Cl.
CPC ................. *H04B 10/0775* (2013.01)

(58) Field of Classification Search
CPC ................. H04B 10/2513; H04B 10/07953
See application file for complete search history.

(56) References Cited

U.S. PATENT DOCUMENTS

| 2003/0011835 | A1* | 1/2003 | Elbers | H04B 10/07953 398/5 |
| 2011/0255870 | A1 | 10/2011 | Grigoryan et al. | |
| 2011/0274442 | A1* | 11/2011 | Zhang | H04B 10/0779 398/208 |
| 2014/0010532 | A1* | 1/2014 | Zhang | H04B 10/0779 398/25 |
| 2015/0333825 | A1* | 11/2015 | Kim | H04B 10/07953 398/26 |

FOREIGN PATENT DOCUMENTS

| CN | 102870353 | 1/2013 |
| WO | 2015/004390 | 1/2015 |

OTHER PUBLICATIONS

Chinese Office Action dated Nov. 28, 2017 in Chinese Patent Application No. 201510068356.3*.

* cited by examiner

*Primary Examiner* — Dzung Tran
(74) *Attorney, Agent, or Firm* — Staas & Halsey LLP

(57) ABSTRACT

A monitoring apparatus and method for an optical signal-to-noise ratio and a receiver, where the apparatus includes: a processing unit configured to perform nonlinear processing on a pilot signal in received signals, or on a pilot signal in received signals and data signals in a predefined range neighboring the pilot signal; and a calculating unit configured to calculate an optical signal-to-noise ratio of the received signals according to a result of the nonlinear processing. Complexity of calculation may be lowered and accuracy of calculation of an optical signal-to-noise ratio may be improved, thereby efficiently improving the performance of the system.

9 Claims, 4 Drawing Sheets

MONITORING APPARATUS AND METHOD FOR AN OPTICAL SIGNAL-TO-NOISE RATIO AND RECEIVER

CROSS-REFERENCE TO RELATED APPLICATIONS

This application relates to the subject matter of the Chinese patent application for invention, Application No. 201510068356.3, filed with Chinese State Intellectual Property Office on Feb. 10, 2015. The disclosure of this Chinese application is considered part of and is incorporated by reference in the disclosure of this application.

BACKGROUND

1. Field

The present disclosure relates to the field of communication technologies, and in particular to a monitoring apparatus and method for an optical signal-to-noise ratio and a receiver.

2. Description of the Related Art

Optical signal-to-noise ratio (OSNR) is an amount directly associated with the performance of a system no matter in a conventional optical communication system with direct detection or in a coherent optical communication system. Hence, much attention has been paid to the study of optical signal-to-noise ratio monitoring technologies.

A conventional measurement method based on a definition of OSNR relies on such conditions as that a noise power spectrum is flat, and there exists a section of band in the spectrum that contains noise but contains no signal. As the increase of an optical communication capacity, a transmission length and transmission rate of a coherent optical communication system are greatly increased than before. More optical nodes will result in more fluctuation in a spectral shape of a noise, and an assumption that optical noises are uniformly distributed in a spectrum is facing more challenges. And at the same time, as channel spacing is greatly reduced, finding a band where signals may be neglected to measure noise power becomes an impractical subject. Hence, measurement of an OSNR in a coherent communication system becomes a new hot spot of studies.

In a practical communication system, besides noises in a transmission link itself, a noise introduced by a nonlinear effect is also contained. As a correlation length of a nonlinear noise itself is very short, view from a frequency domain, a power spectrum of a noise introduced by the nonlinear effect is hard to be differentiated from a white noise of the transmission link itself. Hence, for a general OSNR monitoring method, an estimation value of a noise will be overlarge, hence, an estimation value of the corresponding OSNR will be relatively small, which is disadvantageous to the estimation of the system performance of the whole transmission link.

Currently, a nonlinear compensation algorithm based on digital signal processing may be used to compensate for a nonlinear noise, so as to improve the system performance.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

If the above existing nonlinear compensation algorithm is used to process a nonlinear noise, complexity of the calculation process is very high, and the practical operability is poor.

Embodiments of the present disclosure provide a monitoring apparatus and method for an optical signal-to-noise ratio and a receiver, in which by performing nonlinear processing on a pilot signal in received signals, or on a pilot signal in received signals and data signals in a predefined range neighboring the pilot signal, and calculating an optical signal-to-noise ratio of the received signals according to a result of the nonlinear processing, no nonlinear processing is needed to be performed on the whole received signals, complexity of calculation may be lowered and accuracy of calculation of an optical signal-to-noise ratio may be improved, thereby efficiently improving the performance of the system.

According to a first aspect of the embodiments of the present disclosure, there is provided a monitoring apparatus for an optical signal-to-noise ratio, including: a processing unit configured to perform nonlinear processing on a pilot signal in received signals, or on a pilot signal in received signals and data signals in a predefined range neighboring the pilot signal; and a calculating unit configured to calculate an optical signal-to-noise ratio of the received signals according to a result of the nonlinear processing.

According to a second aspect of the embodiments of the present disclosure, there is provided a receiver, including the monitoring apparatus for an optical signal-to-noise ratio as described in the first aspect of the embodiments of the present disclosure.

According to a third aspect of the embodiments of the present disclosure, there is provided a monitoring method for an optical signal-to-noise ratio, including: performing nonlinear processing on a pilot signal in received signals, or on a pilot signal in received signals and data signals in a predefined range neighboring the pilot signal; and calculating an optical signal-to-noise ratio of the received signals according to a result of the nonlinear processing.

An advantage of the embodiments of the present disclosure exists in that by performing nonlinear processing on the pilot signal in the received signals, or on the pilot signal in received signals and data signals in a predefined range neighboring the pilot signal, and calculating an optical signal-to-noise ratio of the received signals according to a result of the nonlinear processing, no nonlinear processing is needed to be performed on the whole received signals, complexity of calculation may be lowered and accuracy of calculation of an optical signal-to-noise ratio may be improved, thereby efficiently improving the performance of the system.

With reference to the following description and drawings, the particular embodiments of the present disclosure are disclosed in detail, and the principles of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

Figure 1:
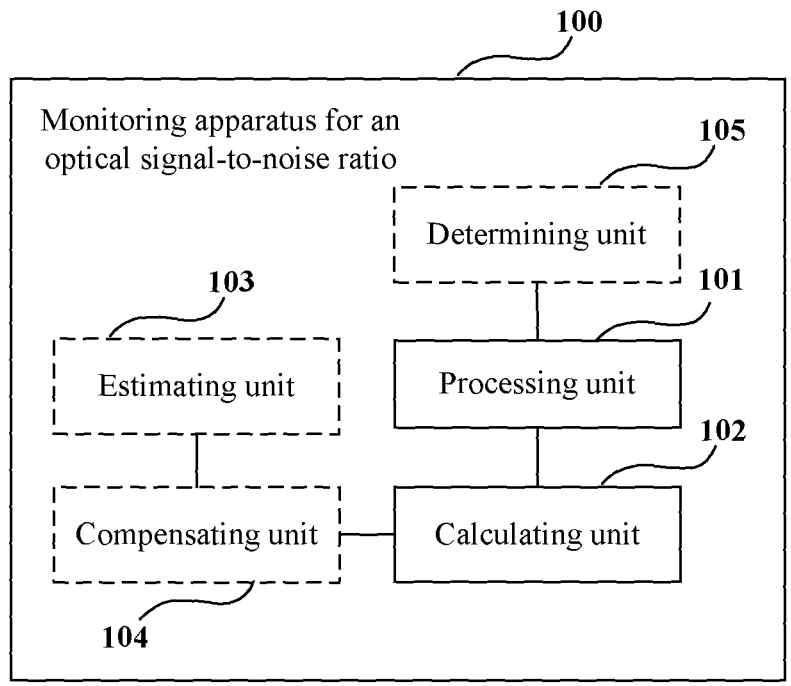
FIG. 1 is a schematic diagram of a structure of the monitoring apparatus for an optical signal-to-noise ratio of Embodiment 1 of the present disclosure.

FIG. 1 is a schematic diagram of a structure of the monitoring apparatus for an optical signal-to-noise ratio of Embodiment 1 of the present disclosure. As shown in FIG. 1, the apparatus 100 includes: a processing unit 101 and a calculating unit 102.

The processing unit 101 is configured to perform nonlinear processing on a pilot signal in received signals, or on a pilot signal in received signals and data signals in a predefined range neighboring the pilot signal;

and the calculating unit 102 is configured to calculate an optical signal-to-noise ratio of the received signals according to a result of the nonlinear processing.

It can be seen from the above embodiment that by performing nonlinear processing on the pilot signal in the received signals, or on the pilot signal in received signals and data signals in a predefined range neighboring the pilot signal, and calculating an optical signal-to-noise ratio of the received signals according to a result of the nonlinear processing, no nonlinear processing is needed to be performed on the whole received signals, complexity of calculation may be lowered and accuracy of calculation of an optical signal-to-noise ratio may be improved, thereby efficiently improving the performance of the system.

In this embodiment, the received signals are signals in an optical communication system that are transmitted from a transmission end and received at a receiving end after passing through a transmission link. As the pilot signal is interpolated into the received signals, the pilot signal is contained in the received signals.

In this embodiment, the pilot signal interpolated into the received signals may be a pilot signal sequence constituted alternatively by positive and negative signals, and may also be pilot signals at different frequencies at two polarization states, and a manner of transmission of a pilot signal is not limited in embodiments of the present disclosure.

Figure 2:
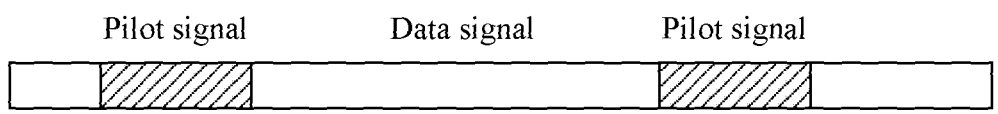
FIG. 2 is a schematic diagram of transmission signals of Embodiment 1 of the present disclosure.

FIG. 2 is a schematic diagram of transmission signals of this embodiment. As shown in FIG. 2, the transmission signals include pilot signals and data signals; wherein the data signals are data that are actually transmitted, and are also referred to as payload data.

In this embodiment, in order to obtain the pilot signal in the received signals, after signals are received at a receiving end, a location of the pilot signal in the received signals needs to be determined. For example, frame synchronization may be performed on the received signals, and the location of the pilot signal in the received signals may be determined according to frame structures of the transmission signals at a transmission end. And a method for determining the location of the pilot signal in the received signals is not limited in embodiments of the present disclosure.

In this embodiment, the processing unit 101 may be configured to perform nonlinear processing on the pilot signal in the received signals, or on the pilot signal in the received signals and the data signals in a predefined range neighboring the pilot signal by using an existing method. For example, the predefined range may be set according to an actual situation.

In this embodiment, the pilot signal is widened during transmission due to a nonlinear effect in an optical fiber transmission link. Thus, accuracy of calculation of the optical signal-to-noise ratio may further be improved by performing nonlinear processing by intercepting part of the data signals including those neighboring the pilot signal.

In this embodiment, the calculating unit 102 is configured to calculate the optical signal-to-noise ratio of the received signals according to the result of the nonlinear processing. For example, the calculating unit 102 is configured to calculate noise power according to the result of the nonlinear processing, and calculate signal power according to the data signals in the received signals, so as to calculate the optical signal-to-noise ratio of the received signals.

In this embodiment, the apparatus 100 may further include:

an estimating unit 103 configured to estimate residual dispersion in the received signals according to the pilot signal in the received signals; and a compensating unit 104 configured to perform dispersion compensation on the data signals in the received signals according to an estimation result of the residual dispersion;

and the calculating unit 102 is configured to calculate noise power according to the result of the nonlinear processing, and calculate signal power according to a result of the dispersion compensation, so as to calculate the optical signal-to-noise ratio of the received signals.

In this embodiment, the estimating unit 103 is configured to estimate the residual dispersion in the received signals according to the pilot signal in the received signals. For example, the residual dispersion in the received signals may be estimated by calculating delay differences between the pilot signals in the pilot signal sequence.

In this embodiment, existing methods may be used for calculating the noise power according to the result of the nonlinear processing and calculating the signal power according to the result of the dispersion compensation.

The methods for calculating the noise power, the signal power and the optical signal-to-noise ratio of this embodiment shall be illustrated below.

Figure 3:
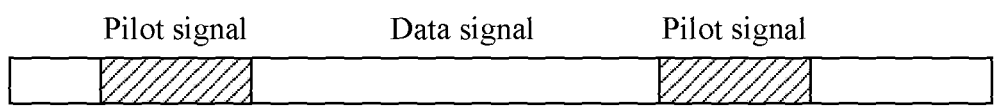
FIG. 3 is a schematic diagram of a transmission codeword time sequence and corresponding frequency spectrum densities of Embodiment 1 of the present disclosure.
Figure 3:
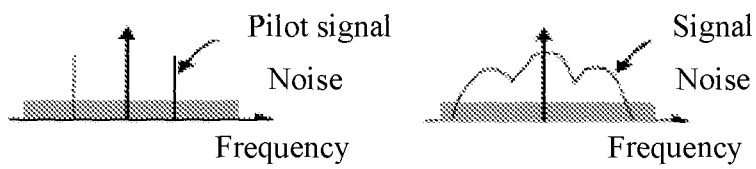

FIG. 3 is a schematic diagram of a transmission codeword time sequence and corresponding frequency spectrum densities of this embodiment. Assuming that noises are uniformly distributed in a range of a band, the noise power is equal to a power spectrum density of a noise multiplied by a spectrum width. As shown in FIG. 3, a length of the shadowed part denotes the spectrum width, and the noise power may be obtained by multiplying the noise power spectrum density of the received signals with the pilot signal being nonlinearly processed by the spectrum width. In this embodiment, in order to tolerate a certain frequency difference (or a residual frequency difference), frequency spots of the pilot signal may be expanded leftwards or rightwards by several frequency spots.

In this embodiment, the calculation of the signal power is selected to be performed at a time period of the data signals (payload signals). This is because that several optical filters are contained in the optical fiber transmission link, and as attenuation of the pilot signal located on the frequency spot is not equal to an average loss of the signals, the power of the pilot signal is not equal to the power of the signals at the receiver end, and the power obtained through calculation at the time period of the data signals (payload signals) is equal to a sum of the signal power and the noise power. Therefore, the signal power may be obtained by combining the above noise power.

In this embodiment, after obtaining the noise power and the signal power of the received signals, following Formula (1), for example, may be used to calculate the optical signal-to-noise ratio of the received signals:

$$\text{OSNR} = 10 * \log 10(S/n) - 10 * \log 10(12.5e9/\text{Bandwidth}) \qquad (1);$$

where, OSNR denotes the optical signal-to-noise ratio of the received signals, S denotes the signal power, n denotes the noise power, Bandwidth denotes a signal bandwidth, and 12.5e9 denotes a numeral value used due to that noise power in a bandwidth of 12.5 GHz needs to be taken into account in the calculation of the OSNR; however, the numeral value 12.5e9 may be adjusted according to a particular bandwidth.

In this embodiment, if the pilot signals interpolated into the received signals are pilot signals at different frequencies at the two polarization states, noise power and signal power at the two polarization states may be calculated respectively, so as to obtain optical signal-to-noise ratios at the two polarization states respectively.

In this embodiment, the apparatus 100 may further include:

a determining unit 105 configured to determine a parameter of the nonlinear processing; for example, a parameter making a noise power spectrum density of the pilot signals minimum is taken as the parameter of the nonlinear processing.

In this embodiment, the estimating unit 103, the compensating unit 104 and the determining unit 105 are optional, and are shown in dashed boxes in FIG. 1.

In this embodiment, if there exists a nonlinear noise, a noise floor will be raised, and if a nonlinear compensation algorithm is adopted, the nonlinear noise will be suppressed, and the noise floor will also be lowered to a level of an amplified spontaneous emission (ASE) noise. Therefore, an optimal parameter of nonlinear processing may be simply and efficiently determined by taking the parameter making a noise power spectrum density of the pilot signal minimum as the parameter of the nonlinear processing.

In this embodiment, the parameter of nonlinear processing may be any parameter used for nonlinear processing. For example, the parameter of the nonlinear processing is at least one of nonlinear coefficient γ, lengths of optical fiber spans in a transmission link and vectors of the optical fiber spans.

In this embodiment, description shall be given taking that the parameter of the nonlinear processing is a nonlinear coefficient γ as an example.

Figure 4:
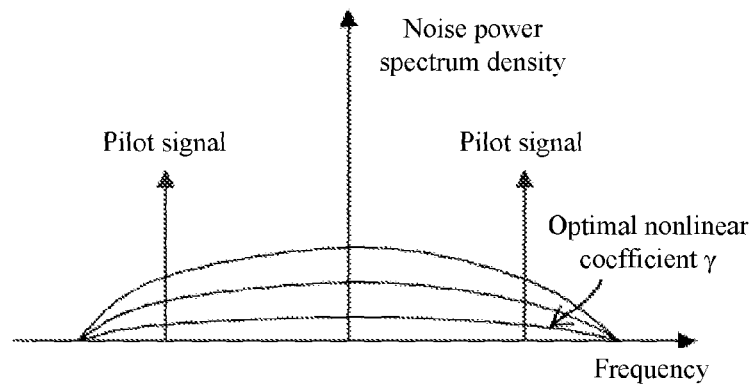
FIG. 4 is a schematic diagram of noise power spectrum densities of received signals of Embodiment 1 of the present disclosure.

FIG. 4 is a schematic diagram of noise power spectrum densities of the received signals of this embodiment. As shown in FIG. 4, noise power spectrum densities to which different nonlinear coefficients γ correspond are obtained by scanning, and a nonlinear coefficient γ to which a curve of a lowest noise power spectrum density corresponds as an optimal nonlinear coefficient γ, which is used for performing the above nonlinear processing.

Figure 5:
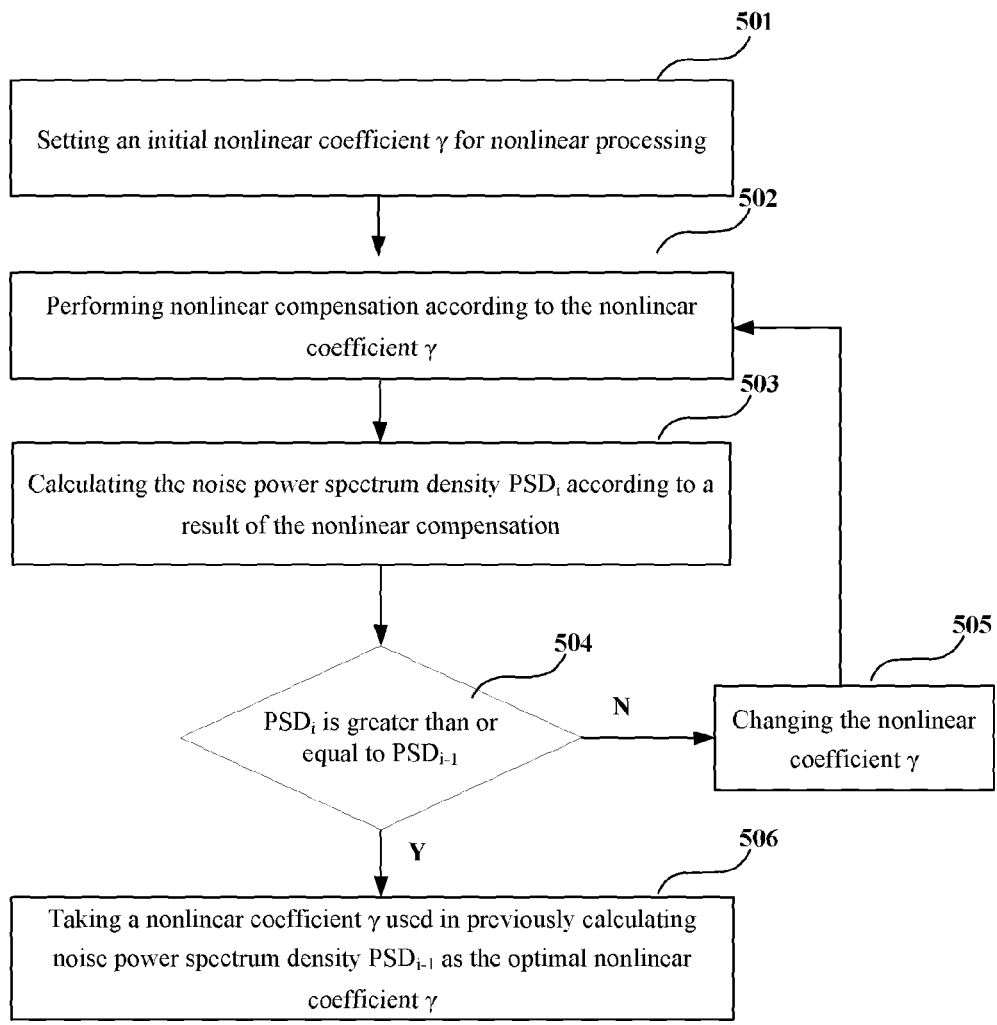
FIG. 5 is a flowchart of a method for selecting an optimal nonlinear coefficient γ to perform nonlinear processing on a pilot signal of Embodiment 1 of the present disclosure.

FIG. 5 is a flowchart of a method for selecting an optimal nonlinear coefficient γ to perform nonlinear processing on pilot signals of this embodiment. As shown in FIG. 5, the method includes:

step 501: setting an initial nonlinear coefficient γ for nonlinear processing;

step 502: performing nonlinear compensation according to the nonlinear coefficient γ;

step 503: calculating the noise power spectrum density PSDi according to a result of the nonlinear compensation;

step 504: comparing the noise power spectrum density PSDi with a previously calculated noise power spectrum density PSDi−1, so as to judge whether the noise power spectrum density PSDi is greater than or equal to the previously calculated noise power spectrum density PSDi−1, entering into step 505 when PSDi<PSDi−1, and entering into step 506 when PSDi≥PSDi−1;

step 505: changing the nonlinear coefficient γ, and turning back to step 502; and step 506: taking a nonlinear coefficient γ used in previously calculating noise power spectrum density PSDi−1 as the optimal nonlinear coefficient γ.

Figure 6:
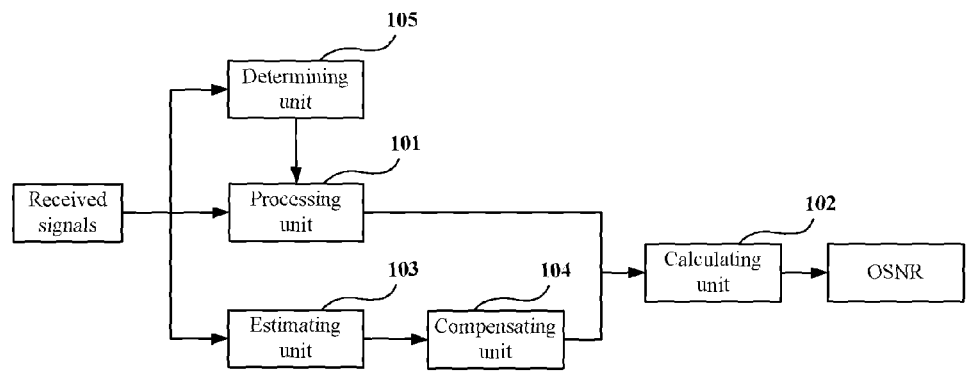
FIG. 6 is a flowchart of using the monitoring apparatus 100 for an optical signal-to-noise ratio to perform monitoring on an optical signal-to-noise ratio of Embodiment 1 of the present disclosure.

FIG. 6 is a flowchart of using the monitoring apparatus 100 for an optical signal-to-noise ratio to perform monitoring on an optical signal-to-noise ratio of this embodiment. As shown in FIG. 6, the received signals are respectively inputted into the processing unit 101, the estimating unit 103 and the determining unit 105; the processing unit 101 is configured to perform nonlinear processing on the pilot signal in the received signals, the estimating unit 103 is configured to estimate the residual dispersion in the received signals according to the pilot signal in the received signals, the determining unit 105 is configured to take the parameter making a noise power spectrum density of the pilot signal minimum as the parameter of the nonlinear processing, and provide the determined parameter of the nonlinear processing to the processing unit 101 for the nonlinear processing, the compensating unit 104 is configured to perform dispersion compensation on the data signals in the receives signals according to a result of estimation of the residual dispersion by the estimating unit 103, and the calculating unit 102 is configured to calculate the noise power according to a result of the nonlinear processing performed by the processing unit 101, and calculate the signal power according to a result of the dispersion compensation performed by the compensating unit 104, so as to calculate the optical signal-to-noise ratio of the received signals.

It can be seen from the above embodiment that by performing nonlinear processing on the pilot signal in the received signals, or on the pilot signal in received signals and data signals in a predefined range neighboring the pilot signal, and calculating an optical signal-to-noise ratio of the received signals according to a result of the nonlinear processing, no nonlinear processing is needed to be performed on the whole received signals, complexity of calculation may be lowered and accuracy of calculation of an optical signal-to-noise ratio may be improved, thereby efficiently improving the performance of the system.

Embodiment 2

An embodiment of the present disclosure further provides a receiver, including a monitoring apparatus for an optical signal-to-noise ratio, a structure and function of the monitoring apparatus for an optical signal-to-noise ratio being identical to those described in Embodiment 1, which shall not be described herein any further.

Figure 7:
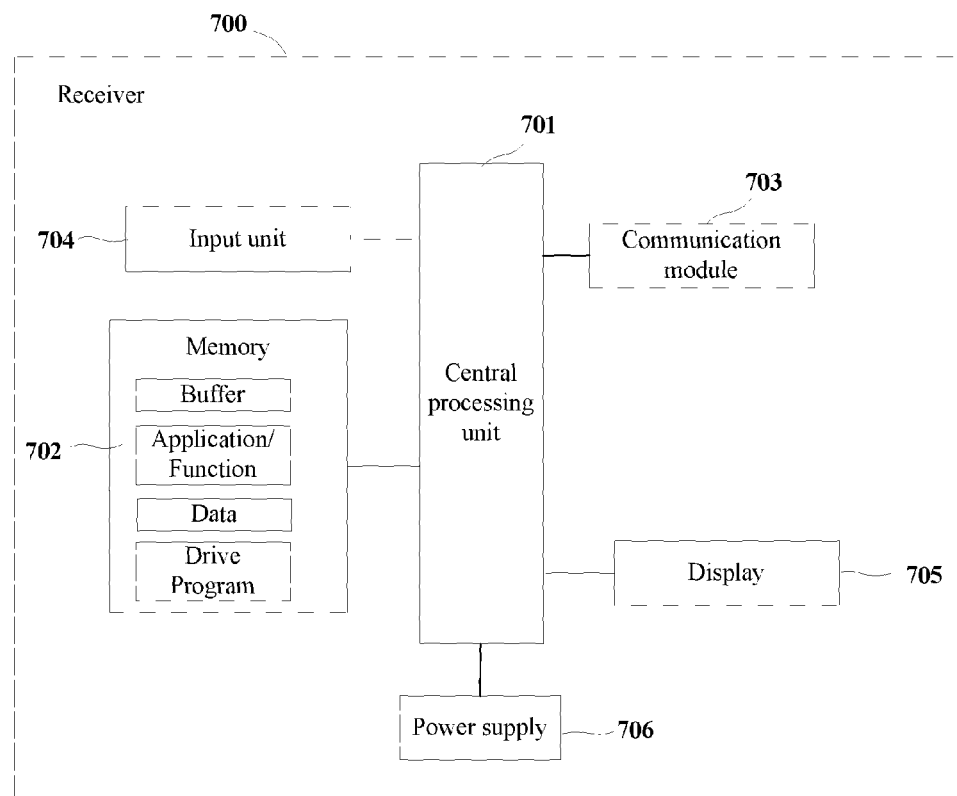
FIG. 7 is a schematic diagram of a structure of the receiver of Embodiment 2 of the present disclosure.

FIG. 7 is a schematic diagram of a structure of the receiver of Embodiment 2 of the present disclosure. As shown in FIG. 7, the receiver 700 may include a central processing unit 701 and a memory 702, the memory 702 being coupled to the central processing unit 701. This figure is exemplary only, and other types of structures may be used to supplement or replace this structure for the realization of telecommunications functions or other functions.

As shown in FIG. 7, the receiver 700 may further include a communication module 703, an input unit 704, a display 705, and a power supply 706.

In an implementation, functions of the monitoring apparatus for an optical signal-to-noise ratio may be incorporated into the central processing unit 701. For example, the central processing unit 701 may be configured to perform nonlinear processing on pilot signal in received signals, or on pilot signal in received signals and data signals in a predefined range neighboring the pilot signal; and calculate an optical signal-to-noise ratio of the received signals according to a result of the nonlinear processing.

In this embodiment, the central processing unit 701 may further be configured to estimate residual dispersion in the received signals according to the pilot signal in the received signals; and perform dispersion compensation on the data signals in the received signals according to an estimation result of the residual dispersion; and calculating an optical signal-to-noise ratio of the received signals according to a result of the nonlinear processing includes: calculating noise power according to the result of the nonlinear processing, and calculating signal power according to a result of the dispersion compensation, so as to calculate the optical signal-to-noise ratio of the received signals.

In this embodiment, the central processing unit 701 may further be configured to determine a parameter of the nonlinear processing; wherein a parameter making a noise power spectrum density of the pilot signals minimum is taken as the parameter of the nonlinear processing.

In this embodiment, the parameter of the nonlinear processing is at least one of nonlinear coefficient $\gamma$, lengths of optical fiber spans in a transmission link and vectors of the optical fiber spans.

In another implementation, the monitoring apparatus for an optical signal-to-noise ratio and the central processing unit 701 may be configured separately. For example, the monitoring apparatus for an optical signal-to-noise ratio may be configured as a chip connected to the central processing unit 701, with functions of the monitoring apparatus for an optical signal-to-noise ratio being realized under control of the central processing unit 701.

In this embodiment, the receiver 700 does not necessarily include all the parts shown in FIG. 7.

As shown in FIG. 7, the central processing unit 701 is sometimes referred to as a controller or control, and may include a microprocessor or other processor devices and/or logic devices. The central processing unit 701 receives input and controls operations of every components of the receiver 700.

The memory 702 may be, for example, one or more of a buffer memory, a flash memory, a hard drive, a mobile medium, a volatile memory, a nonvolatile memory, or other suitable devices. And the central processing unit 701 may execute the program stored in the memory 702, so as to realize information storage or processing, etc. Functions of other parts are similar to those of the prior art, which shall not be described herein any further. The parts of the receiver 700 may be realized by specific hardware, firmware, software, or any combination thereof, without departing from the scope of the present disclosure.

It can be seen from the above embodiment that by performing nonlinear processing on the pilot signal in the received signals, or on the pilot signal in received signals and data signals in a predefined range neighboring the pilot signal, and calculating an optical signal-to-noise ratio of the received signals according to a result of the nonlinear processing, no nonlinear processing is needed to be performed on the whole received signals, complexity of calculation may be lowered and accuracy of calculation of an optical signal-to-noise ratio may be improved, thereby efficiently improving the performance of the system.

Embodiment 3

Figure 8:
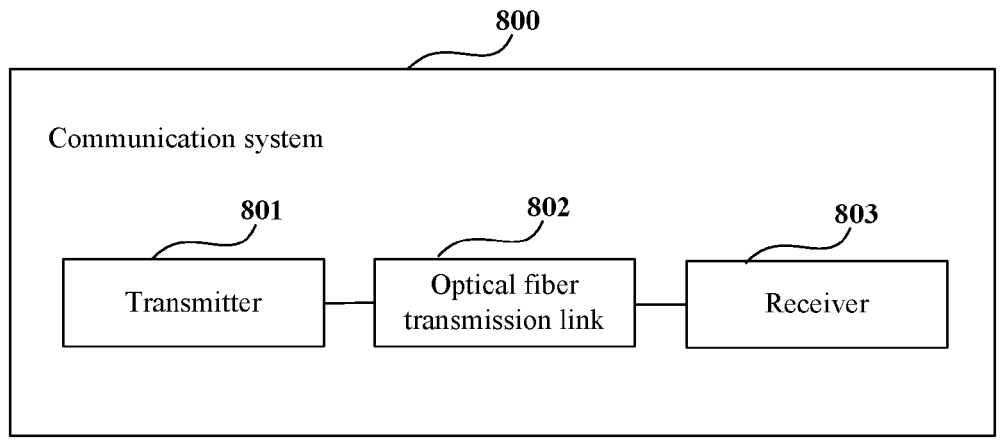
FIG. 8 is a schematic diagram of a structure of the communication system of Embodiment 3 of the present disclosure.

An embodiment of the present disclosure further provides a communication system. FIG. 8 is a schematic diagram of a structure of the communication system of this embodiment. As shown in FIG. 8, the communication system 800 includes a transmitter 801, an optical fiber transmission link 802 and a receiver 803; wherein a structure and functions of the receiver 803 are identical to those described in Embodiment 2, which shall not be described herein any further. The transmitter 801 and the optical fiber transmission link 802 may have structures and functions of an existing transmitter and optical fiber transmission link, and the structures and functions of the transmitter and the optical fiber transmission link are not limited in embodiments of the present disclosure.

It can be seen from the above embodiment that by performing nonlinear processing on the pilot signal in the received signals, or on the pilot signal in received signals and data signals in a predefined range neighboring the pilot signal, and calculating an optical signal-to-noise ratio of the received signals according to a result of the nonlinear processing, no nonlinear processing is needed to be performed on the whole received signals, complexity of calculation may be lowered and accuracy of calculation of an optical signal-to-noise ratio may be improved, thereby efficiently improving the performance of the system.

Embodiment 4

Figure 9:
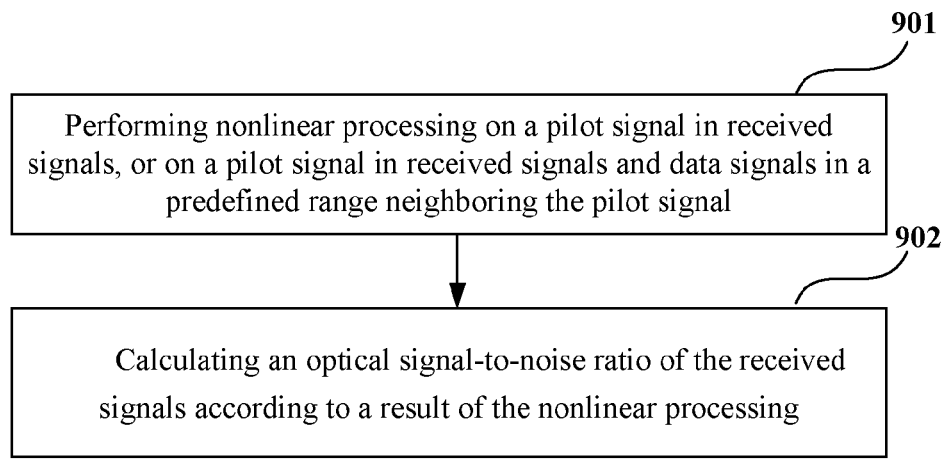
FIG. 9 is a flowchart of the monitoring method for an optical signal-to-noise ratio of Embodiment 4 of the present disclosure.

An embodiment of the present disclosure further provides a monitoring method for an optical signal-to-noise ratio, corresponding to the monitoring apparatus for an optical signal-to-noise ratio of Embodiment 1. FIG. 9 is a flowchart of the monitoring method for an optical signal-to-noise ratio of this embodiment. As shown in FIG. 9, the method includes:

step 901: performing nonlinear processing on a pilot signal in received signals, or on a pilot signal in received signals and data signals in a predefined range neighboring the pilot signal; and step 902: calculating an optical signal-to-noise ratio of the received signals according to a result of the nonlinear processing.

In this embodiment, the method for performing nonlinear processing on the pilot signal in received signals, or on the pilot signal in received signals and data signals in a predefined range neighboring the pilot signal, and the method for calculating an optical signal-to-noise ratio of the received signals according to a result of the nonlinear processing, are identical to those described in Embodiment 1, which shall not be described herein any further.

It can be seen from the above embodiment that by performing nonlinear processing on the pilot signal in the received signals, or on the pilot signal in received signals and data signals in a predefined range neighboring the pilot signal, and calculating an optical signal-to-noise ratio of the received signals according to a result of the nonlinear processing, no nonlinear processing is needed to be performed on the whole received signals, complexity of calculation may be lowered and accuracy of calculation of an optical signal-to-noise ratio may be improved, thereby efficiently improving the performance of the system.

An embodiment of the present disclosure further provides a computer-readable program, wherein when the program is executed in a monitoring apparatus for an optical signal-to-noise ratio or a receiver, the program enables the computer to carry out the monitoring method for an optical signal-to-noise ratio as described in Embodiment 4 in the monitoring apparatus for an optical signal-to-noise ratio or the receiver.

An embodiment of the present disclosure further provides a storage medium in which a computer-readable program is stored, wherein the computer-readable program enables the computer to carry out the monitoring method for an optical signal-to-noise ratio as described in Embodiment 4 in a monitoring apparatus for an optical signal-to-noise ratio or a receiver.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

What is claimed is:

1. A monitoring apparatus for an optical signal-to-noise ratio, comprising:
    a processing unit configured to perform nonlinear processing on one of a pilot signal in received signals and the pilot signal in the received signals and data signals in a predefined range neighboring the pilot signal; and
    a calculating unit configured to calculate an optical signal-to-noise ratio of the received signals according to a result of the nonlinear processing.

2. The apparatus according to claim 1, wherein the apparatus further comprises:
    an estimating unit configured to estimate residual dispersion in the received signals according to the pilot signal in the received signals; and
    a compensating unit configured to perform dispersion compensation on the data signals in the received signals according to an estimation result of the residual dispersion;
    and the calculating unit is configured to calculate noise power according to the result of the nonlinear processing, and calculate signal power according to a result of the dispersion compensation to calculate the optical signal-to-noise ratio of the received signals.

3. The apparatus according to claim 1, wherein the apparatus further comprises:
    a determining unit configured to determine a nonlinear parameter of the nonlinear processing; wherein a noise parameter making a noise power spectrum density of the pilot signals minimum is used as the nonlinear parameter of the nonlinear processing.

4. The apparatus according to claim 3, wherein the nonlinear parameter of the nonlinear processing has at least one of a following information: nonlinear coefficient γ, lengths of optical fiber spans in a transmission link and vectors of the optical fiber spans.

5. A communication system, comprising a receiver which comprises the monitoring apparatus for an optical signal-to-noise ratio as claimed in claim 1.

6. A monitoring method for an optical signal-to-noise ratio, comprising:
    performing nonlinear processing on one of a pilot signal in received signals and the pilot signal in the received signals and data signals in a predefined range neighboring the pilot signal; and
    calculating an optical signal-to-noise ratio of the received signals according to a result of the nonlinear processing.

7. The method according to claim 6, wherein the method further comprises:

estimating residual dispersion in the received signals according to the pilot signal in the received signals; and performing dispersion compensation on the data signals in the received signals according to an estimation result of the residual dispersion;

and the calculating an optical signal-to-noise ratio of the received signals according to a result of the nonlinear processing comprises: calculating noise power according to the result of the nonlinear processing, and calculating signal power according to a result of the dispersion compensation to calculate the optical signal-to-noise ratio of the received signals.

8. The method according to claim 6, wherein the method further comprises:

determining a nonlinear parameter of the nonlinear processing; wherein a noise parameter making a noise power spectrum density of the pilot signals minimum is used as the nonlinear parameter of the nonlinear processing.

9. The method according to claim 8, wherein the nonlinear parameter of the nonlinear processing has at least one of a following information: nonlinear coefficient $\gamma$, lengths of optical fiber spans in a transmission link and vectors of the optical fiber spans.

* * * * *